United States Patent
Sreekantiah et al.

(10) Patent No.: US 7,318,108 B2
(45) Date of Patent: Jan. 8, 2008

(54) METHOD AND APPARATUS PROVIDING PRIORITIZED CONVERGENCE IN BORDER GATEWAY PROTOCOL

(75) Inventors: Arjun Sreekantiah, Santa Clara, CA (US); Ruchi Kapoor, San Jose, CA (US); Keyur Patel, San Jose, CA (US); Robert Raszuk, Komorow (PL)

(73) Assignee: Cisco Technology, Inc., San Jose, CA (US)

( * ) Notice: Subject to any disclaimer, the term of this patent is extended or adjusted under 35 U.S.C. 154(b) by 417 days.

(21) Appl. No.: 11/023,056

(22) Filed: Dec. 22, 2004

(65) Prior Publication Data

US 2006/0133390 A1  Jun. 22, 2006

(51) Int. Cl.
G06F 15/173 (2006.01)

(52) U.S. Cl. .................. 709/242; 709/238

(58) Field of Classification Search .......... 709/223, 709/225, 238–242
See application file for complete search history.

(56) References Cited

U.S. PATENT DOCUMENTS

| | | | |
|---|---|---|---|
| 7,023,808 B2* | 4/2006 | Ball et al. ............... | 370/238 |
| 7,068,624 B1* | 6/2006 | Dantu et al. ............ | 370/331 |
| 7,136,374 B1* | 11/2006 | Kompella ................ | 370/352 |
| 2003/0198182 A1* | 10/2003 | Pegrum et al. ........ | 370/225 |
| 2004/0049597 A1* | 3/2004 | Ould-Brahim .......... | 709/242 |
| 2005/0047353 A1* | 3/2005 | Hares .................... | 370/255 |
| 2005/0094566 A1* | 5/2005 | Hares .................... | 709/238 |
| 2006/0002402 A1* | 1/2006 | Nalawade et al. ..... | 709/223 |

OTHER PUBLICATIONS

Bates, T. et al., "Multiprotocol Extensions for BGP-4," Network Working Group, RFC 2858, Jun. 2000, 11 pages.
Rekhter, Y. et al., "A Border Gateway Protocol 4 (BGP-4)," Network Working Group, RFC 1771, Mar. 1995, 57 pages.

* cited by examiner

*Primary Examiner*—Phuoc Nguyen
(74) *Attorney, Agent, or Firm*—Hickman Palermo Truong & Becker LLP

(57) ABSTRACT

A method is disclosed for providing prioritized routing table convergence in Border Gateway Protocol (BGP) hosts, as part of a BGP process that is executed by a route processor in a network, wherein the processor hosts a plurality of BGP routing tables each associated with a specified sub-address family (SAFI). A convergence priority order value is created and stored in association with each routing table. As part of performing a convergence phase of BGP processing, the convergence priority order value of each routing table is obtained. The convergence phase is then performed for the routing tables only according to an order that is represented by the convergence priority order values. Therefore, convergence proceeds more quickly and values needed by other routing processes become available earlier.

33 Claims, 6 Drawing Sheets

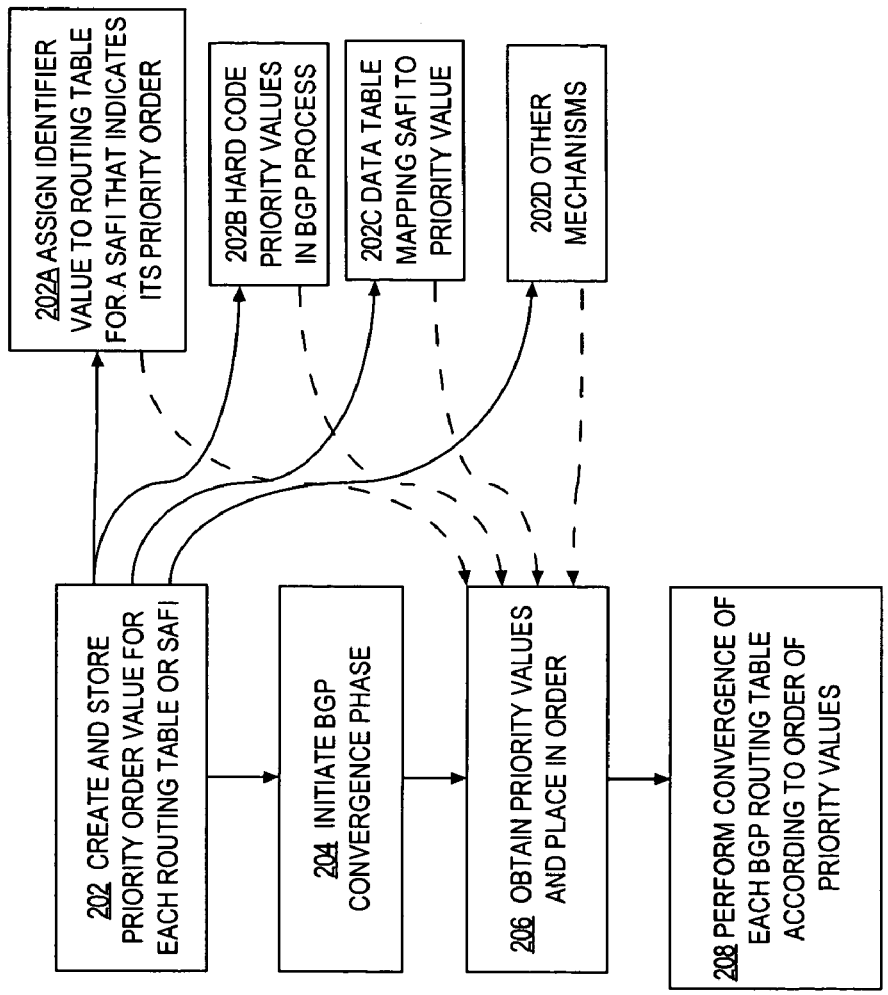

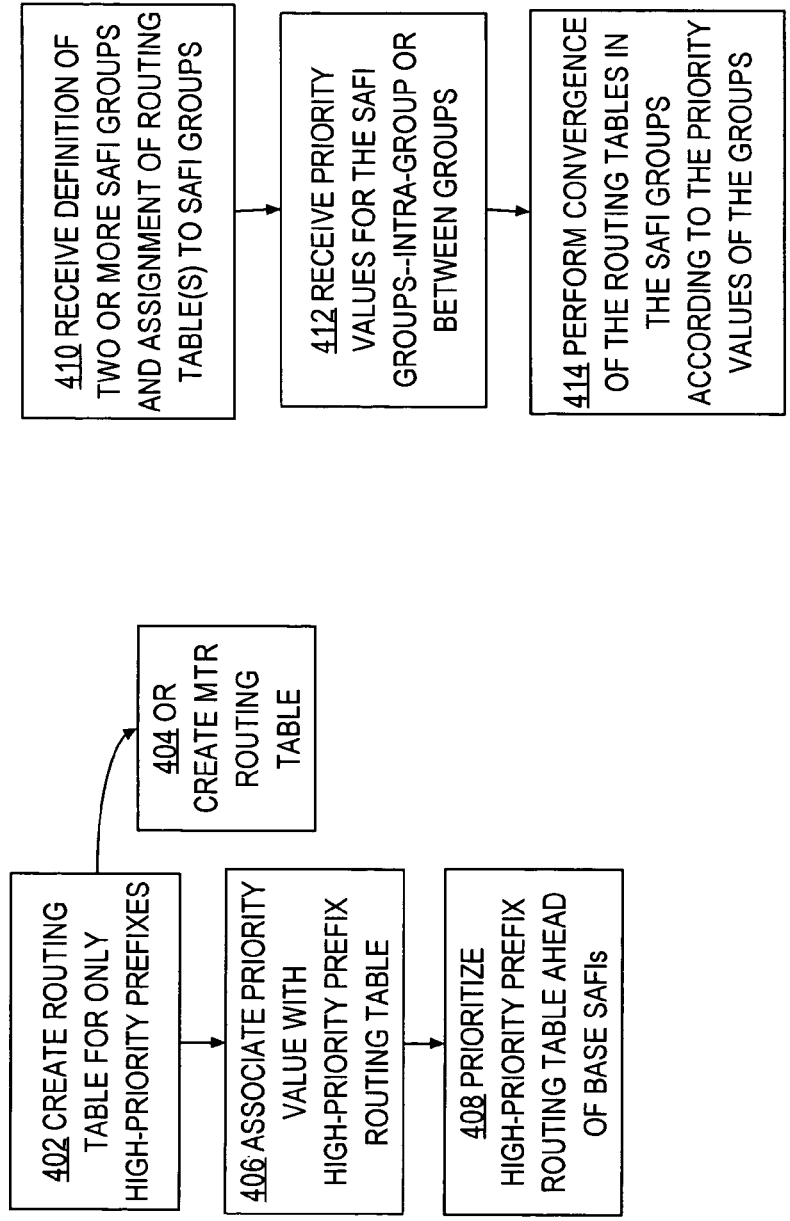

METHOD AND APPARATUS PROVIDING PRIORITIZED CONVERGENCE IN BORDER GATEWAY PROTOCOL

FIELD OF THE INVENTION

The present invention generally relates to routing in telecommunications networks. The invention relates more specifically to methods for performing convergence in Border Gateway Protocol (BGP).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for inter-Autonomous System routing. The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995).

To exchange routing information, two BGP hosts first establish a peering session by exchanging BGP OPEN messages. The BGP hosts then exchange their full routing tables. After this initial exchange, each BGP host sends to its BGP peer or peers only incremental updates for new, modified, and unavailable/withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path. In a BGP host, the routes are stored in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

After exchanging route information, each BGP peer independently performs a series of calculations, including determining best paths among hosts, using the routing table information. In a process termed convergence, each BGP peer generates update messages to remote peers, and each peer eventually arrives at a complete set of usable routing information.

As defined in RFC1771, the structure of a BGP UPDATE message accommodates updates only to Internet Protocol version 4 (IPv4) unicast routes. The Multiprotocol Extension for BGP defined in RFC2858 (published by IETF in June 2000) accommodates updates to routing information for multiple Network Layer protocols, such as, for example, Internet Protocol version 6 (IPv6), Internetwork Packet eXchange (IPX), Appletalk, Banyan Vines, Asynchronous Transfer Mode (ATM), X.25, and Frame Relay. RFC2858 introduced two single-value parameters to accommodate the changes to the BGP UPDATE message structure: the Address Family Identifier (AFI) and the Subsequent Address Family Identifier (SAFI).

The AFI parameter carries the identity of the network layer protocol associated with the network address that follows next in the path to the destination. The SAFI parameter provides additional information about the type of the Network Layer Reachability Information that is included in a BGP UPDATE message, and the values defined for this parameter usually indicate a type of communication forwarding mechanism, such as, for example, unicast or multicast. While some of the AFI and SAFI values are reserved for private use, the AFI and SAFI values that can be commonly used by the public must be assigned through the Internet Assigned Numbers Authority (IANA). The AFI/SAFI combination is used by the software implementations of BGP to indicate the type of the BGP prefix updates, what format the prefix updates have, and how to interpret the routes included in the BGP UPDATE messages.

However, a problem with current BGP implementations is that convergence requires too much time because of the sheer number of routes that are stored in the routing tables of BGP peers. For example, in many service provider networks, the BGP tables stored by routers comprise a few hundred thousand prefixes. During the convergence phase, BGP peers need to exchange these thousands of prefixes with each other. Converging all these prefixes for all the different BGP address families takes in the order of minutes.

Thus, as BGP table sizes grow larger, there is an increasing need to improve BGP convergence times.

Further, there is an increasing need to improve overall convergence inclusive of the time it takes for traffic to begin forwarding.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram of a process of prioritized convergence in BGP according to an embodiment;

FIG. 4A is a flow diagram of a process of using a routing table for high-priority prefixes, in one embodiment;

FIG. 4B is a flow diagram of a process of using groups of routing tables with priority values, in one embodiment.

DETAILED DESCRIPTION

Figure 1:
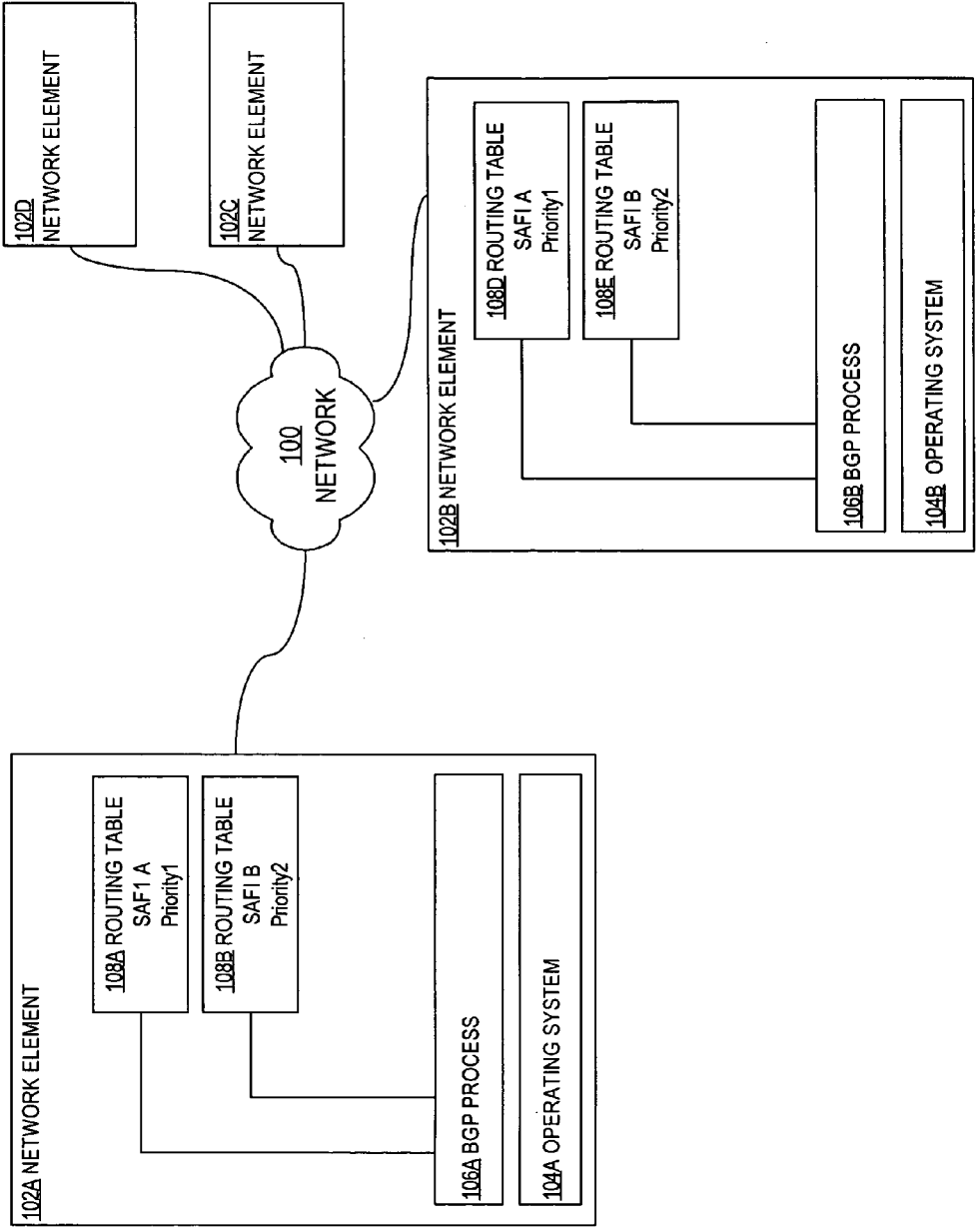
FIG. 1 is a block diagram of an overview of network elements with which an embodiment may be implemented.

A method and apparatus for prioritizing routing table convergence in Border Gateway Protocol (BGP) is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Description of Example Embodiments
   2.1 Structural and Functional Overview
   2.2 Examples of Priority Convergence for Specific SAFIs
   2.3 High-Priority Routing Tables
   2.4 Defining Groups with Inter-Group Priority Values 3.0 Implementation Mechanisms-Hardware Overview
4.0 Extensions and Alternatives
APPENDIX—Accelerated BGP Convergence

1.0 General Overview

The needs identified in the foregoing Background, and other needs and objects that will become apparent for the following description, are achieved in the present invention, which comprises, in one aspect, a method for providing context-based routing table updates in Border Gateway Protocol (BGP) hosts, as part of a BGP process that is executed by a route processor in a network, wherein the processor hosts a plurality of BGP routing tables each associated with a specified sub-address family (SAFI). A convergence priority order value is created and stored in association with each routing table. As part of performing a convergence phase of BGP processing, the convergence priority order value of each routing table is obtained. The convergence phase is then performed for the routing tables only according to an order that is represented by the convergence priority order values. Therefore, convergence proceeds more quickly and values needed by other routing processes become available earlier.

According to one feature, a first routing table that is associated with a reachability/tunnel encapsulation SAFI is prioritized ahead of a second routing table that is associated with a base SAFI. For example, the first routing table is associated with an IPv4 Tunnel SAFI and the second routing table is associated with a VPNv4 SAFI.

In another feature, a first routing table that is associated with a filter SAFI is prioritized ahead of a second routing table that is associated with a base SAFI. For example, the first routing table is associated with a route target (RT) filter SAFI, and the second routing table is associated with any of a VPNv4 SAFI or VPNv6 SAFI.

In yet another feature, a first routing table that is associated with an Accelerated BGP Convergence SAFI is prioritized ahead of a second routing table that is associated with a base SAFI. For example, the second routing table is associated with any of an IPv4 SAFI, IPv6 SAFI, VPNv4 SAFI and VPNv6 SAFI.

In still another feature, a first routing table that is associated with a BGP VPNv4 SAFI is prioritized ahead of a second routing table that is associated with a BGP IPv4 SAFI.

According to another feature the method further comprises creating a first routing table and storing only high-priority prefixes in the first routing table; creating and storing a first priority value for the first routing table that prioritizes the first routing table ahead of one or more second routing tables that are associated respectively with one or more base SAFIs. For example, the first routing table is a multi-topology routing (MTR) topology routing table.

In yet another feature the method, further comprises receiving a definition of two or more SAFI groups and information assigning one or more routing tables to each of the SAFI groups; receiving two or more priority values respectively associated with the two or more SAFI groups; and performing convergence of the routing tables in the SAFI in the SAFI groups only according to the priority values of the SAFI groups.

In still another feature, the method further comprises creating a first routing table and storing only high-priority prefixes in the first routing table; creating and storing a first priority value for the first routing table that prioritizes the first routing table ahead of one or more second routing tables that are associated respectively with one or more base SAFIs; receiving a definition of two or more SAFI groups and information assigning one or more routing tables to each of the SAFI groups; receiving two or more priority values respectively associated with the two or more SAFI groups; and performing convergence of the routing tables in the SAFI in the SAFI groups only according to the priority values of the SAFI groups.

In another aspect, the invention encompasses a computer apparatus configured to carry out the steps described above. In a feature of this aspect, the computer apparatus is a router. In a different aspect, the invention encompasses a computer-readable medium configured to carry out the foregoing steps.

2.0 Description of Example Embodiments

2.1 Structural and Functional Overview

FIG. 1 is a block diagram that illustrates an overview of network elements upon which one embodiment may be implemented. BGP-enabled network elements 102A, 102B, 102C, and 102D are communicatively coupled to network 100. For illustrating a clear example, FIG. 1 shows only four network elements but other embodiments can be implemented by any number of network elements that are connected to a network.

According to this embodiment, network element 102A includes operating system 104A and BGP process 106A, which runs on top of the operating system. BGP process 106A maintains a set of routing tables, examples of which are routing tables 108A, 108B. As depicted in FIG. 1, routing table 108A stores routes described as "SAFI A" and is assigned a priority value of "Priority1". Similarly, routing table 108B stores routes described as "SAFI B" and is assigned a priority value of "Priority2". The priority values can be resolved into an order such that Priority1 is either higher or lower in priority than Priority2.

Network element 102B also implements this embodiment and includes operating system 104B and BGP process 106B, which runs on top of the operating system. BGP process 106B maintains a set of routing tables, examples of which are routing tables 108D, 108E. As depicted in FIG. 1, routing table 108D stores routes described as "SAFI A" and is assigned a priority value of "Priority1". Similarly, routing table 108E stores routes described as "SAFI B" and is assigned a priority value of "Priority2". The values of the SAFIs and priority values in FIG. 1 that describe and identify routing tables in network elements 102A and 102B are used for illustrative purposes only, and any set or types of values may be used instead.

Generally, the techniques herein provide ways to reduce the convergence time of SAFIs based on two general models or paradigms. In a first paradigm, SAFI A and SAFI B of FIG. 1 are related. Convergence of SAFI B is improved, for example, by prioritizing SAFI A ahead of SAFI B; the prioritization is reflected on both network elements 102A, 102B, and therefore the convergence of SAFI B is improved network-wide. In another paradigm, SAFI A and SAFI B are not related, and prioritizing SAFI A's convergence will speed up the convergence of SAFI A but not SAFI B. Specific cases for each paradigm are described further in Section 2.2 below.

Routing table identifiers such as SAFI A, SAFI B, SAFI C represent a combination of address family (AF) and sub-address family (SAFI). For example, each of SAFI A, SAFI B, SAFI C may identify a routing table that stores network address prefixes that correspond to the information shown in any one row of Table 1:

TABLE 1

EXAMPLE ROUTING TABLE CONTENTS
AS GIVEN BY AFI/SAFI

| AFI | SAFI | TYPE |
|---|---|---|
| ipv4 | Unicast | IPv4 address |
| ipv4 | Multicast | IPv4 address |
| ipv4 | Vpn | VPN-IPv4 address |
| ipv6 | Unicast | IPv6 address |

In one embodiment, during the initial set up of a BGP session between them, network elements 102A and 102B advertise their respective SAFIs, optionally advertise priority values, and negotiate for which routing tables they can exchange routes. As illustrated in FIG. 1, network element 102A can exchange routes from its routing table 108B with routing table 108D in network element 102B, because the SAFI of routing table 108B matches the SAFI of routing table 108D.

Once network elements 102A and 102B have negotiated the routing tables for which they can exchange routes, they can exchange and update routes by assembling and sending BGP UPDATE messages. Each of the network elements also can perform BGP convergence on the routing tables, including generating UPDATE messages, to arrive at best path calculations and other values needed for routing traffic.

From the foregoing and from the Background section above it is apparent that BGP uses many address families (AFs) and sub-address address families (SAFIs), and there is a separate BGP routing table for each supported combination of an AF and SAFI. According to the techniques herein, a priority ordering is applied to the BGP SAFI routing tables during convergence, such that the BGP routing table of a higher priority SAFI converges faster than that of a lower priority SAFI.

Further, all steps of processing during the convergence phase, such as sourcing of local routes, best path calculations, installing received routes into the RIB and update generation are ordered according to the priority of the given BGP SAFI table.

In one embodiment, an implied ordering of BGP SAFIs for convergence processing is provided, in implementations in which there is a one-to-one correspondence between a BGP SAFI and a BGP table. In another embodiment, such as for implementations that support multi-topology routing (MTF), one BGP table per topology is provided, and an implementation will have multiple BGP tables for each SAFI. In such an embodiment, an explicit ordering between the various BGP topology tables is provided.

FIG. 2 is a flow diagram of a process of prioritized convergence in BGP according to an embodiment. In step 202, a priority order value is created and stored for each routing table, based on the SAFI that is associated with the routing table. For example, as indicated in block 202A, establishing the priority value may involve assigning a unique identifier to each routing table that reflects its priority order. For example, a routing table for the AFI/SAFI combination for IPv4 unicast, carrying IPv4 addresses, could have a table identifier of "0,""29," or any other value that represents its ordinal position in an order of SAFIs or routing tables that is applied at convergence time.

Alternatively, as in block 202B, block 202C, and block 202D, establishing the priority value may involve hard-coding the priority values in a BGP process, storing the priority values in a data table that maps SAFIs or routing table identifiers to priority values, or through other mechanisms. In still another alternative, priority values for routing tables of various SAFIs may be received as parameters in a command-line interface (CLI) command, as described below in section 2.4. In yet another alternative, an explicit ordering may be imposed by defining a table specifically for high-priority prefixes, as described in section 2.3.

In step 204, a convergence phase of BGP processing is initiated. Step 204 may be performed, for example, at the time that a router, or other device that implements BGP, reboots or restarts the BGP process.

In step 206, the priority values for the routing tables are obtained and placed in order. The specific steps used for obtaining the priority values may vary depending on what mechanism is used to establish the priority values as indicated for step 202 of FIG. 2. For example, obtaining the priority values may involve examining the identifier values of routing tables in code that implements the BGP process, and then performing convergence of the routing tables in the order given by the identifier values. Examples of specific routing tables for various SAFIs that may have priority convergence applied for various reasons are described further below in connection with FIG. 3A, FIG. 3B, FIG. 3C, FIG. 3D.

Alternatively, obtaining the priority values may comprise retrieving values from a data table that maps SAFIs or routing table identifiers to the priority values and sorting the retrieved values in priority order.

In step 208, the convergence phase of BGP processing is performed according to the order of the priority values. Step 208 can involve conventional BGP convergence but only performed on the routing tables in the order indicated by the priority order values. As a result, for example, a BGP component first converges a first routing table, hands off converged values to another component that may interact with a remote peer in the BGP session, then converges a second, lower-priority routing table and hands off information resulting from that convergence. Accordingly, certain components of the remote peer will acquire needed information in a more useful order so that, ultimately, a flow of data traffic can proceed among the peers more rapidly.

Further, when one BGP peer performs prioritized convergence using the foregoing general approach, all peer nodes of that BGP peer automatically and necessarily will perform prioritized convergence. This occurs because the peer nodes will receive converged route information only as the first peer distributes it, which occurs in the priority order.

2.2 Examples of Priority Convergence for Specific SAG-FIs

Figures 3A, 3B:
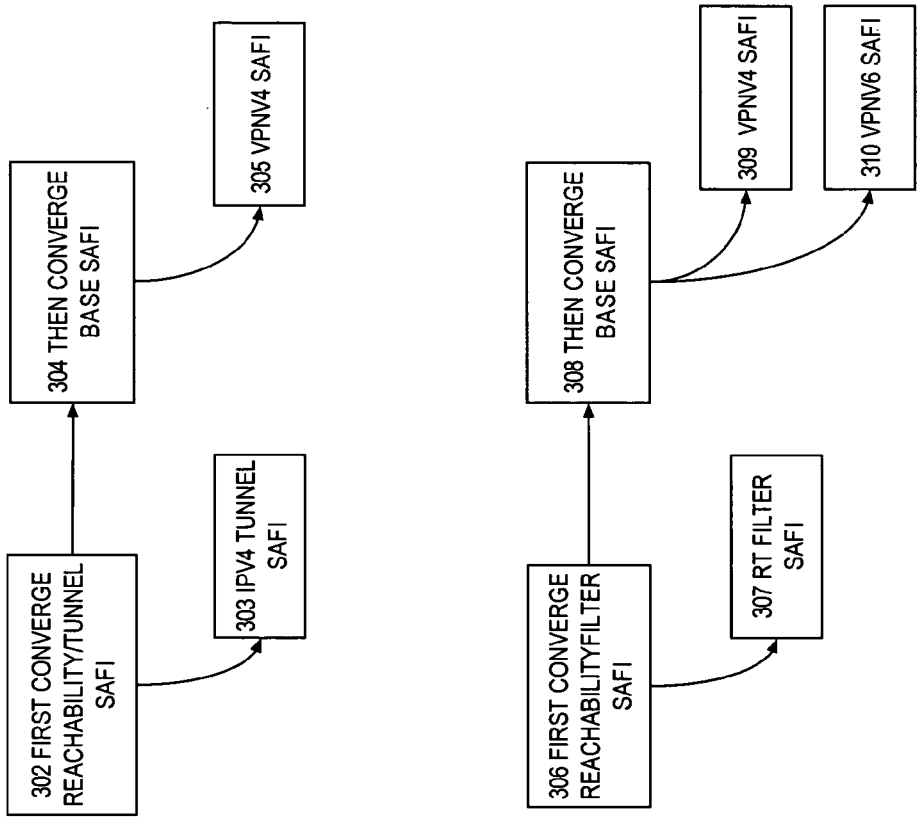
FIG. 3A, FIG. 3B, FIG. 3C, and FIG. 3D are flow diagrams of various examples of prioritized convergence for various routing tables, in certain embodiments.

FIG. 3A, FIG. 3B, FIG. 3C, and FIG. 3D are flow diagrams of various examples of prioritized convergence for various routing tables, in certain embodiments. Referring first to FIG. 3A, in step 302, a reachability/tunnel SAFI is converged first, followed by performing convergence of a base SAFI at step 304. Thus, one application of the techniques herein is to prioritize a reachability/encapsulation SAFI, which may be the IPv4 Tunnel SAFI as indicated at block 303, ahead of a base SAFI, such as the VPNv4 SAFI as indicated by block 305. The term "VPN" has its conventional meaning of "virtual private network."

The IPv4 Tunnel SAFI carries tunnel encapsulation parameters that are used for establishing tunnels between provider edge routers ("PE" devices). The PE devices use these tunnels for forwarding VPN traffic. By converging the IPv4 Tunnel SAFI before the VPNv4 SAFI, the IP tunnels between the PE devices are always established and available by the time that the PE devices are ready to converge the VPNv4 prefixes. Further, head-of-the-line blocking and latency issues are eliminated by observing the foregoing order. When converging the VPNv4 table, the VPNv4 prefixes are resolved through the IP Tunnels which have already been created. Thus, the prioritization of FIG. 3A ultimately ensures establishing traffic flow immediately.

The approach of FIG. 3A is not limited to any one kind of tunnel encapsulation, but is applicable to any tunnel encapsulation that uses a BGP encapsulation SAFI, for example, generic routing encapsulation (GRE), IPSec encapsulation, etc.

Referring now to FIG. 3B, in step 306, a reachability/filter SAFI is converged first, followed by converging a base SAFI at step 308. Thus, another application of the techniques herein is to prioritize a reachability/filter SAFI, such as the RT Filter SAFI as indicated by block 307, ahead of a base SAFI, such as the VPNv4 SAFI or VPNv6 SAFI as indicated by block 309 and block 310.

The RT Filter SAFI carries VPN filtering information. The NLRI field of the RT Filter SAFI carries values identifying extended community type Route Targets. The filtering information dictates the matching criteria for VPNv4 and VPNv6 routes that needs to be announced to a BGP peer from which the filtering information is received. Scheduling the announcement, best path calculation and processing of inbound data for the RT Filter SAFI ahead of its base SAFI assists in converging the RT Filter SAFI ahead of the base SAFI. This is turn causes a peer to send announcements of filters before the processing of VPNv4 and VPNv6 SAFIs. Sending such announcements early allows effective processing and announcing of only VPNv4 and VPNv6 updates that are required, as the necessary extended community based filtering information is already in place. Processing such updates in this manner also speeds convergence.

For increasing the speed of initial convergence, the approach of FIG. 3B is used along with initial convergence timers. The initial convergence timers ensure that the BGP peers will not announce VPNv4 and VPNv6 routes before a certain amount of time elapses, thereby providing time for the RT Filter SAFI to converge.

Figures 3C, 3D:
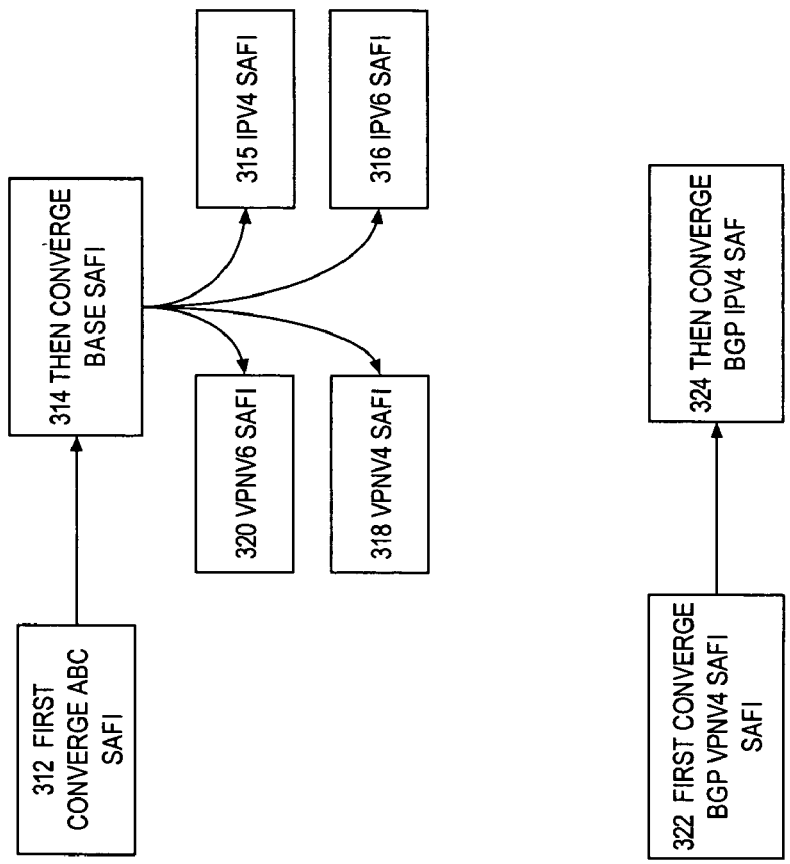

Referring now to FIG. 3C, in step 312 convergence of an Accelerated BGP Convergence (ABC) SAFI is performed first, followed by performing convergence of a base SAFI. Thus, another application of the general technique of FIG. 2 is to prioritize the ABC SAFI ahead of all its base SAFIs, such as IPv4, IPv6, VPNv4, and VPNv6. Techniques for performing Accelerated BGP Convergence are described herein in the Appendix.

One alternative way of carrying VL-mapper information is using BGP, as opposed to IGPs as described in the Appendix. Carrying this information within BGP ahead of all the base SAFIs allows BGP to converge faster, because the next hop information is synchronized up before the reachability information arrives. Such faster convergence further assists BGP in signaling whether the next hop is reachable, which in turn results in faster convergence between autonomous systems.

FIG. 3A, FIG. 3B, and FIG. 3C present applications in which higher and lower priority SAFIs are related. The general techniques of FIG. 2 also apply to situations in which a higher priority SAFI is not related to a lower priority SAFI. Referring now to FIG. 3D, in step 322 convergence is first performed for the BGP VPNv4 SAFI, and in step 322 convergence is then performed for the BGP IPv4 SAFI. Thus, the BGP VPNv4 SAFI is prioritized ahead of the BGP IPv4 SAFI.

The BGP IPv4 table is generally much larger than the BGP VPNv4 table, and therefore the VPNv4 table generally can converge faster than the BGP IPv4 table. Also, service providers may have service level agreements (SLAs) with VPN customers that require a certain minimum level of service as a condition of payment by the customer. During convergence, the overall time taken to converge the BGP VPNv4 SAFI may be very long if it is done after the BGP IPv4 SAFI. By prioritizing the BGP VPNv4 SAFI before the BGP IPv4 SAFI, convergence times for the VPNv4 SAFI improve, which allows service providers to meet the SLAs with their customers.

2.3 High-Priority Routing Tables

Another application of the general techniques of FIG. 2 is to prioritize the processing that is needed for convergence within a single BGP SAFI table, and apply the ordering to part of a BGP routing table.

FIG. 4A is a flow diagram of a process of using a routing table for high-priority prefixes, in one embodiment. In step 402, a routing table is created to store only high-priority prefixes. In step 404, a priority value is associated with the high-priority prefix routing table. In step 408, convergence for the high-priority prefix routing table is performed ahead of convergence for base SAFIs.

Thus, in the approach of FIG. 4A, a subset of prefixes in a particular BGP routing table are treated as important, and these prefixes are converged before other prefixes in that BGP table. The particular prefixes that are stored in the high-priority table at step 402 may be defined in any manner. For example, in an embodiment that is implemented in a router that a router vendor sells to a customer, the sub-set of high-priority prefixes is defined by the customer as any set of prefixes that the customer wants to have converge faster. As a particular example, some prefixes may have a higher class of service traffic flowing to them (e.g., voice over IP traffic), so the customer may want to converge these prefixes before the rest.

In one embodiment, FIG. 4A is implemented by defining a SAFI for sourcing the higher priority prefixes, ordering that SAFI to have a higher priority than the base SAFI, and applying the process of FIG. 2. In an implementation that supports multi-topology routing, a new topology table may be defined, rather than a new SAFI, for the higher priority prefixes, as indicated by block 404 of FIG. 4A 2.4 Defining Groups with Inter-Group Priority Values The approaches of FIG. 3A, FIG. 3B, FIG. 3C, FIG. 3D, and FIG. 4A define prioritization between sets of SAFIs and the effect of prioritizing one particular SAFI over other SAFIs. Additionally or alternatively, any of the approaches herein may use the concept of SAFI groups.

FIG. 4B is a flow diagram of a process of using groups of routing tables with priority values, in one embodiment. In step 410, a definition of two or more SAFI groups and information assigning one or more routing tables to each of the SAFI groups are received. At step 412, two or more priority values respectively associated with the two or more SAFI groups are received. Step 412 may involve assigning values to each routing table or SAFI that is within a SAFI groups. Additionally or alternatively, step 412 may involve assigning or associating priority values for groups as a whole. In this alternative, all SAFIs in a first group with a higher priority are converged before all SAFIs in a second group with a lower priority. At step 414, convergence is performed for the routing tables in the SAFI in the SAFI groups only according to the priority values of the SAFI groups.

In one implementation, an operating system of a network element includes a command-line interface (CLI) with commands that allow creating such SAFI groups. The CLI may also allow multiple SAFIs to be grouped together, and allow assigning priority values to the SAFIs with respect to one another. In one embodiment, a priority value requested by a particular CLI command cannot override a specified priority policy. For example, a stored policy may provide that an RT Filter SAFI always needs to be sent before VPNv4 and VPNv6, so the priority value of the RT Filter SAFI is higher than VPNv4 or VPNv6. For such a case, the SAFI priority cannot be changed by a CLI command.

A CLI implementation also may provide a command that allows assigning priority values within grouped SAFI whenever a group can be prioritized.

3.0 Implementation Mechanisms—Hardware Overview

Figure 5:
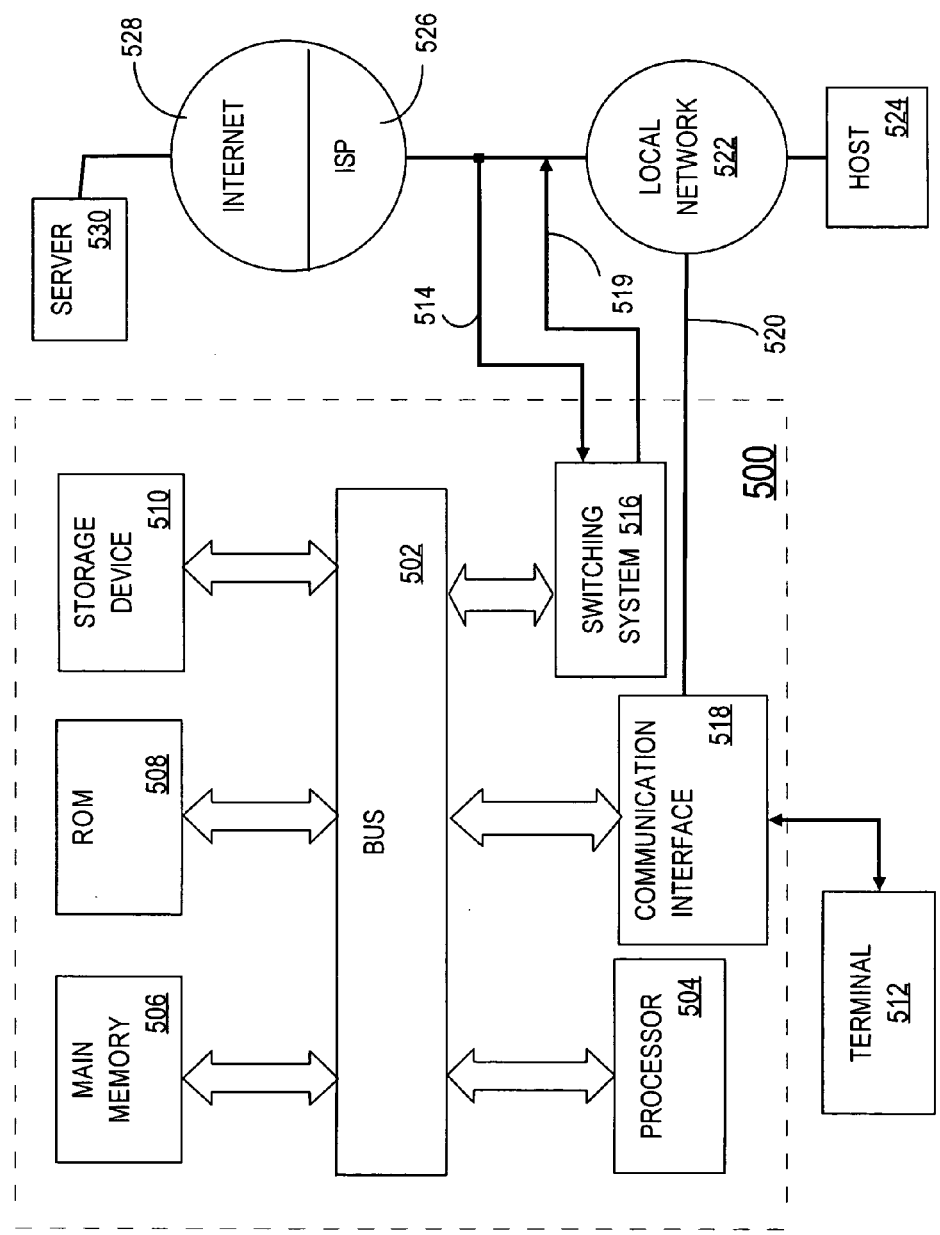
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for providing prioritized convergence in a BGP process. According to one embodiment of the invention, prioritized convergence in a BGP process is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for prioritized convergence in a BGP process as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Embodiments of the invention provide numerous improvements over prior art approaches. For example, an embodiment allows the prioritization of important BGP SAFI routing tables ahead of the other BGP SAFIs. An embodiment also allows the prioritization of a few important prefixes ahead of the entire BGP table. Further, specific embodiments optimize the time to begin forwarding traffic for VRF prefixes over IP tunnels. An implementation of the techniques herein can be used in the BGP components in a network element operating system to improve the performance of convergence operations. For example, Cisco IOS, ION and IOX software from Cisco Systems, Inc., San Jose, Calif. can use these techniques. The techniques herein also can be used by any network element, operating system or process that implements BGP address families.

APPENDIX TO SPECIFICATION

Accelerated BGP Convergence

With the introduction of NHT/ATF features which in an asynchronous way notify BGP about next hop's reachability there are new ways to utilize those components for accelerated network wide BGP convergence.

In this idea we will examine existing apparatus and propose a couple of new inventions which will result in an accelerated convergence in a single unified way without necessity for any hardware changes in the forwarding plane for both tunneled core (mpls/IP tunnels) or native IP switching.

A goal of the accelerated BGP convergence process is to achieve sub second BGP convergence network wide. A further goal of the accelerated BGP convergence is to speed up remote failure detection impacting current data paths without the necessity to modify forwarding plane as well as without even temporarily occurring sub optimal routing.

The scope is to address with this solution all of the below operational scenarios:
IPv4/IPv6 forwarding without next hop self on ASBR
IPv4/IPv6 forwarding with next hop self on ASBRs
IPv4/IPv6 forwarding with native or tunneled core
VPNv4/VPNv6 remote CE failure (p2p to PE)
VPNv4/VPNv6 remote CE failure (multihop p2p to PE)
VPNv4/VPNv6 remote CE failure (via multi-access to PE)
VPNv4/VPNv6 PE-CE link failure (P2P or multi-access)
VPNv4/VPNv6 PE failure The solution should work equally well for BGP learned routes or redistributed locally by the edge router.

For clarity we will divide the document into three functional blocks:
A. Down event detection & propagation
B. Association of the failed entity with BGP routes and it's propagation
D. Node's control plane behavioral changes and reaction to triggers Section A: Down Event Detection & Information Propagation:

We will focus on detection and propagation of the following failure types:
A1. CE node
A2. PE-CE link failure
A3. PE/ASBR failure All of the above failure modes need to be directly mapped to the next hops of the received routes. The link/node liveness detection itself can be realized by a number of ways: IGP hellos, BFD, MARP, SAA probing, physical link failures etc . . . This document does not mandate the use of any of them leaving the trigger itself to the implementation or customer choice.

Next hop mapping can be divided into two operational scenarios:
setting next hop on PE/ASBR
not setting next hop on ASBR Note that some applications may force user to set next hop on the edge of the autonomous system (for example 2547).

In the case of PE/ASBR failure when set next hop operation has occurred the failure propagation does not require any additional action** if IGP has been used to propagate the failure information.

A proper BGP next hop as well as Virtual Links flooding prioritization within IGP may be still a plus. It needs to be pointed out that in the Virtual Links only down events are of importance to BGP component. Virtual Link up events are only valuable when BGP has not yet withdrawn the path which became invalid.

In all other cases there needs to be a functional component called "VL-Mapper" which will map received route's original next hops to the links they have arrived on. The term link here represents a virtual link and not a physical one.

For p2p interface types virtual link will map directly to physical/logical link, but on the multi-access interfaces an abstraction layer will be required which will map CE node to each virtual link even if physical medium is shared between a number of CEs connecting to PE.

Such an abstraction also will address all flavors of multihop access techniques as long as proper detection is in place to notice a failure in a timely fashion.

Virtual links information will be flooded domain wide by the IGP as an opaque data. It is expected that IGP will not process any information contained in the carried new TLV but upon reception and integrity verification it will be immediately passed to a new component responsible on the BGP side for an action.

It should suffice to say here that the virtual link ids assigned by the VL-Mapper have only local significance as in any other node of the network they will always be used in conjunction with the PE/ASBR router_id as a tuples.

As the proposed encoding for Virtual Links information in OSPF we suggest an extension to OSPF Router Information LSA. The format of OSPF Router Information LSA is indicated for reference in FIG. 1 as proposed in draft-ietf-ospf-cap-03.txt FIG. 2 ISIS Capability TLV Depending on BGP configuration flooding scope within ISIS level or route leaking between levels can be set in the flag field via S bit. VL-Mapper via cli configuration will be responsible for informing OSPF about required flooding scope.

Virtual Link TLV/sub-TLV is presented in FIG. 3:

```
 0                   1                   2                   3
 0 1 2 3 4 5 6 7 8 9 0 1 2 3 4 5 6 7 8 9 0 1 2 3 4 5 6 7 8 9
+-+-+-+-+-+-+-+-+-+-+-+-+-+-+-+-+-+-+-+-+-+-+-+-+-+-+-+-+-+-+
| LS age         | Options        | 10 or 11                |
+-+-+-+-+-+-+-+-+-+-+-+-+-+-+-+-+-+-+-+-+-+-+-+-+-+-+-+-+-+-+
| 4              | 0                                        |
+-+-+-+-+-+-+-+-+-+-+-+-+-+-+-+-+-+-+-+-+-+-+-+-+-+-+-+-+-+-+
|Advertising Router                                         |
+-+-+-+-+-+-+-+-+-+-+-+-+-+-+-+-+-+-+-+-+-+-+-+-+-+-+-+-+-+-+
| LS sequence number                                        |
+-+-+-+-+-+-+-+-+-+-+-+-+-+-+-+-+-+-+-+-+-+-+-+-+-+-+-+-+-+-+
| LS checksum    | length                                   |
+-+-+-+-+-+-+-+-+-+-+-+-+-+-+-+-+-+-+-+-+-+-+-+-+-+-+-+-+-+-+
|
+-TLVs
|...
```

FIG. 1. OSPF Router Information LSA

Depending on BGP configuration flooding scope within the area (code 10) and domain wide flooding scope (code 11) are applicable. VL-Mapper via cli configuration will be responsible for informing OSPF about required flooding scope.

As the proposed encoding of Virtual Links information in ISIS we suggest an addition of new Virtual Links sub-TLV as an extension to ISIS Capability TLV (FIG. 2) as defined in draft-vasseur-isis-caps-02.txt.

```
 0                   1                   2
 0 1 2 3 4 5 6 7 8 9 0 1 2 3 4 5 6 7 8 9 0 1 2 3 4 5 6 7 8 9
+-+-+-+-+-+-+-+-+-+-+-+-+-+-+-+-+-+-+-+-+-+-+-+-+-+-+-+-+-+-+
| Type   | Length   | Flags     | RTR_                      |
+-+-+-+-+-+-+-+-+-+-+-+-+-+-+-+-+-+-+-+-+-+-+-+-+-+-+-+-+-+-+
| _ID   |
+-+-+-+-+-+-+-+-+-+-+-+-+-+-+-+-+-+-+-+-+-+-+-+-+-+-+-+-+-+-+
|
+-sub-TLVs
|...
```

```
 0 1 2
 0 1 2 3 4 5 6 7 8 9 0 1 2 3 4 5 6 7 8 9 0 1 2 3 4 5 6 7 8 9
+-+-+-+-+-+-+-+-+-+-+-+-+-+-+-+-+-+-+-+-+-+-+-+-+-+-+-+-+-+-+
| Type    | Length
+-+-+-+-+-+-+-+-+-+-+-+-+-+-+-+-+-+-+-+-+-+-+-+-+-+-+-+-+-+-+
| BGP Rtr_ID
+-+-+-+-+-+-+-+-+-+-+-+-+-+-+-+-+-+-+-+-+-+-+-+-+-+-+-+-+-+-+
| Virtual Link 1 | Reserved  |U|D|
+-+-+-+-+-+-+-+-+-+-+-+-+-+-+-+-+-+-+-+-+-+-+-+-+-+-+-+-+-+-+
| ......         | .......
+-+-+-+-+-+-+-+-+-+-+-+-+-+-+-+-+-+-+-+-+-+-+-+-+-+-+-+-+-+-+
| Virtual Link N | Reserved  |U|D|
+-+-+-+-+-+-+-+-+-+-+-+-+-+-+-+-+-+-+-+-+-+-+-+-+-+-+-+-+-+-+
```

FIG. 3 Virtual Link TLV

It is important to point out that what is being send in the Virtual Link TLV/sub-TLV it is only negative transition (up  down) information for a given Virtual Link rather then a description of all up states of those Virtual Links. Such an negative transition should be marked with D bit set.

The positive transition from down  up state is optional. An implementation may choose to include this information for those Virtual Links which were signaled within configured interval of time about negative transition. Due to the fact that the nature of this information is to signal transition to already signaled by BGP routes it is advised for this signaling to wait 2× BGP Read Only mode to make sure that all BGP speakers in the given IGP domain have already converged after initial boot up phase.

It is assumed that no more then 60 simultaneous bad events will be signaled in the single Virtual Link TLV.

Section B: Association of the Failed Entity with BGP Routes and it's Propagation:

The meaning of virtual links IDs is valid only with conjunction with the originator router-id or any of the bgp next hop IP address rewritten by the PE/ASBR node. Virtual link presence is also tightly coupled with the prefix values itself.

We define a new BGP community type called Virtual Links community to carry associated virtual links ids FIG. 4. The Virtual Links Community is of an extended type.

Virtual Links is a new type of BGP Extended Community Attribute. It is a non transitive in the AS scope and in the same time transitive in a per bgp speaker scope within the domain. It carries virtual link ID for the associated routes and is only allocated on the ASBR/PE nodes.

The value of the high-order octet of the Type Field is 0×40. The value of the low-order octet of the Type field for this community is (TBD). The value of the Global Administrator sub-field (2 octets) is used to carry Virtual_Link_ID. The Router_ID is expressed as 4 octets and is carried in the Local Administrator sub-field of the Value Field.

```
 0 1 2
 0 1 2 3 4 5 6 7 8 9 0 1 2 3 4 5 6 7 8 9 0 1 2 3 4 5 6 7 8 9
+-+-+-+-+-+-+-+-+-+-+-+-+-+-+-+-+-+-+-+-+-+-+-+-+-+-+-+-+-+-+
| 0X40  | TBD    | Virtual Link ID
+-+-+-+-+-+-+-+-+-+-+-+-+-+-+-+-+-+-+-+-+-+-+-+-+-+-+-+-+-+-+
| BGP RTR ID
+-+-+-+-+-+-+-+-+-+-+-+-+-+-+-+-+-+-+-+-+-+-+-+-+-+-+-+-+-+-+
```

The ingress node has to propagate best path as well as second best external path (if available) to all of his IBGP peers along with the associated VL's. RRs if used need to propagate all received paths. Both of those can be accomplished with the use of ADD Paths or Group Best Path approaches.

Once the required virtual links are identified VL-Mapper needs to inform BGP about the virtual link IDs allocated to the corresponding original next hops or original sources of the routes.

FIG. 4 Virtual Links BGP Extended Community

Section C: Node's Control Plane Behavioral Changes and Reaction to Triggers:

Flooded virtual links+advertising router id tuples on their reception in the IGP need to be immediately passed to a filtering component responsible for filtering registered Virtual Links IDs.

Once received by appropriate BGP filter client process all associated paths with given tuple will be invalidated, best path run and product of new best path (if different) installed into the RIB.

An implementation may also utilize here the pre computed second best path when after the VL down msg reception new best path run will not be necessary but the second best will be enabled.

The invention on BGP <-> RIB <-> FIB interaction for the grouped second best switchover without the necessity to re-resolve any of the BGP routes will be documented in the separate document. That could be a further optimization to accelerated BGP convergence but is not required.

Thus the ABC process presented herein provides:
Invention of association of Virtual Links idea to external routes and its propagation
A new AS wide BGP trigger for failed external routes invalidation without waiting for all BGP
No need to tune BGP protocol timers
Optimal routing with no tunneling at all times
Applicabilty for pure IP (example: Internet) or MPLS based networks and services (example: 2547)

The approach herein allows for significant few orders of magnitude speed up in BGP AS wide convergence. It allows for very fast propagation (normally invisible to IGP) failures without essentially triggering any more work for the IGP's SPF. Builds on top of already available and shipping BGP & IGP components.

In the case of 2547 bis based VPNs it works for any PE-CE dynamic routing protocol.

What is claimed is:

1. A method, comprising the machine-implemented steps of:
    as part of a Border Gateway Protocol (BGP) process that is executed by a digital electronic route processor in a telecommunications network, wherein the processor hosts a plurality of BGP routing tables each associated with a specified sub-address family (SAFI), creating and storing a convergence priority order value in association with each routing table;
    as part of performing a convergence phase of BGP processing, obtaining the convergence priority order value of each routing table;
    performing the convergence phase for the routing tables only according to an order that is represented by the convergence priority order values.

2. A method as recited in claim 1, wherein a first routing table that is associated with a reachability/tunnel encapsulation SAFI is prioritized ahead of a second routing table that is associated with a base SAFI.

3. A method as recited in claim 2, wherein the first routing table is associated with an IPv4 Tunnel SAFI and the second routing table is associated with a VPNv4 SAFI.

4. A method as recited in claim 1, wherein a first routing table that is associated with a filter SAFI is prioritized ahead of a second routing table that is associated with a base SAFI.

5. A method as recited in claim 4, wherein the first routing table is associated with an RT filter SAFI, and the second routing table is associated with any of a VPNv4 SAFI or VPNv6 SAFI.

6. A method as recited in claim 1, wherein a first routing table that is associated with an Accelerated BGP Convergence SAFI is prioritized ahead of a second routing table that is associated with a base SAFI.

7. A method as recited in claim 6, wherein the second routing table is associated with any of an IPv4 SAFI, IPv6 SAFI, VPNv4 SAFI and VPNv6 SAFI.

8. A method as recited in claim 1, wherein a first routing table that is associated with a BGP VPNv4 SAFI is prioritized ahead of a second routing table that is associated with a BGP IPv4 SAFI.

9. A method as recited in claim 1, further comprising:
    creating a first routing table and storing only high-priority prefixes in the first routing table;
    creating and storing a first priority value for the first routing table that prioritizes the first routing table ahead of one or more second routing tables that are associated respectively with one or more base SAFIs.

10. A method as recited in claim 9, wherein the first routing table is a multi-topology routing (MTR) topology routing table.

11. A method as recited in claim 1, further comprising:
    receiving a definition of two or more SAFI groups and information assigning one or more routing tables to each of the SAFI groups;
    receiving two or more priority values respectively associated with the two or more SAFI groups;
    performing convergence of the routing tables in the SAFI groups only according to the priority values of the SAFI groups.

12. A method as recited in claim 1, further comprising:
    creating a first routing table and storing only high-priority prefixes in the first routing table;
    creating and storing a first priority value for the first routing table that prioritizes the first routing table ahead of one or more second routing tables that are associated respectively with one or more base SAFIs;
    receiving a definition of two or more SAFI groups and information assigning one or more routing tables to each of the SAFI groups;
    receiving two or more priority values respectively associated with the two or more SAFI groups;
    performing convergence of the routing tables in the SAFI groups only according to the priority values of the SAFI groups.

13. A computer system, comprising:
    one or more route processors;
    an electronic digital memory that is communicatively coupled to the one or more route processors;
    a Border Gateway Protocol (BGP) process that is executed by the one or more route processors, wherein the one or more route processors host a plurality of BGP routing tables each associated with a specified sub-address family (SAFI);
    one or more sequences of instructions stored in the memory which are operable to cause the one or more route processors to perform the steps of:
        creating and storing a convergence priority order value in association with each routing table;
        as part of performing a convergence phase of BGP processing, obtaining the convergence priority order value of each routing table;
        performing the convergence phase for the routing tables only according to an order that is represented by the convergence priority order values.

14. A computer system as recited in claim 13, wherein a first routing table that is associated with a reachability/tunnel encapsulation SAFI is prioritized ahead of a second routing table that is associated with a base SAFI.

15. A computer system as recited in claim 13, wherein a first routing table that is associated with a filter SAFI is prioritized ahead of a second routing table that is associated with a base SAFI.

16. A computer system as recited in claim 13, wherein a first routing table that is associated with an Accelerated BGP Convergence SAFI is prioritized ahead of a second routing table that is associated with a base SAFI.

17. A computer system as recited in claim 13, wherein a first routing table that is associated with a BGP VPNv4 SAFI is prioritized ahead of a second routing table that is associated with a BGP IPv4 SAFI.

18. A computer system as recited in claim 13, wherein the one or more sequences of instructions further comprise instructions which are operable to cause the one or more route processors to perform the steps of:
creating a first routing table and storing only high-priority prefixes in the first routing table;
creating and storing a first priority value for the first routing table that prioritizes the first routing table ahead of one or more second routing tables that are associated respectively with one or more base SAFIs.

19. A computer system as recited in claim 13, wherein the one or more sequences of instructions further comprise instructions which are operable to cause the one or more route processors to perform the steps of:
receiving a definition of two or more SAFI groups and information assigning one or more routing tables to each of the SAFI groups;
receiving two or more priority values respectively associated with the two or more SAFI groups;
performing convergence of the routing tables in the SAFI groups only according to the priority values of the SAFI groups.

20. A computer-readable storage medium, comprising one or more sequences of instructions which, when executed by one or more processors, cause the one or more processors to perform the steps of:
creating and storing a convergence priority order value in association with each routing table of a plurality of Border Gateway Protocol (BGP) routing tables each associated with a specified sub-address family (SAFI);
as part of performing a convergence phase of BGP processing, obtaining the convergence priority order value of each routing table;
performing the convergence phase for the routing tables only according to an order that is represented by the convergence priority order values.

21. A computer-readable storage medium as recited in claim 20, wherein a first routing table that is associated with a reachability/tunnel encapsulation SAFI is prioritized ahead of a second routing table that is associated with a base SAFI.

22. A computer-readable storage medium as recited in claim 20, wherein a first routing table that is associated with a filter SAFI is prioritized ahead of a second routing table that is associated with a base SAFI.

23. A computer-readable storage medium as recited in claim 20, wherein a first routing table that is associated with an Accelerated BGP Convergence SAFI is prioritized ahead of a second routing table that is associated with a base SAFI.

24. A computer-readable storage medium as recited in claim 20, wherein a first routing table that is associated with a BGP VPNv4 SAFI is prioritized ahead of a second routing table that is associated with a BGP IPv4 SAFI.

25. A computer-readable storage medium as recited in claim 20, further comprising one or more sequences of instructions for performing the steps of:
creating a first routing table and storing only high-priority prefixes in the first routing table;
creating and storing a first priority value for the first routing table that prioritizes the first routing table ahead of one or more second routing tables that are associated respectively with one or more base SAFIs.

26. A computer-readable storage medium as recited in claim 20, further comprising one or more sequences of instructions for performing the steps of:
receiving a definition of two or more SAFI groups and information assigning one or more routing tables to each of the SAFI groups;
receiving two or more priority values respectively associated with the two or more SAFI groups;
performing convergence of the routing tables in the SAFI groups only according to the priority values of the SAFI groups.

27. A computer system, comprising: means for performing a Border Gateway Protocol (BGP) process that is executed by a digital electronic route processor in a telecommunications network, wherein the processor hosts a plurality of BGP routing tables each associated with a specified sub-address family (SAFI);
means for creating and storing a convergence priority order value in association with each routing table;
means for obtaining, as part of performing a convergence phase of BGP processing, the convergence priority order value of each routing table;
means for performing the convergence phase for the routing tables only according to an order that is represented by the convergence priority order values.

28. A computer system as recited in claim 27, wherein a first routing table that is associated with a reachability/tunnel encapsulation SAFI is prioritized ahead of a second routing table that is associated with a base SAFI.

29. A computer system as recited in claim 27, wherein a first routing table that is associated with a filter SAFI is prioritized ahead of a second routing table that is associated with a base SAFI.

30. A computer system as recited in claim 27, wherein a first routing table that is associated with an Accelerated BGP Convergence SAFI is prioritized ahead of a second routing table that is associated with a base SAFI.

31. A computer system as recited in claim 27, wherein a first routing table that is associated with a BGP VPNv4 SAFI is prioritized ahead of a second routing table that is associated with a BGP IPv4 SAFI.

32. A computer system as recited in claim 27, further comprising:
means for creating a first routing table and storing only high-priority prefixes in the first routing table;
means for creating and storing a first priority value for the first routing table that prioritizes the first routing table ahead of one or more second routing tables that are associated respectively with one or more base SAFIs.

33. A computer system as recited in claim 27, further comprising:
means for receiving a definition of two or more SAFI groups and information assigning one or more routing tables to each of the SAFI groups;
means for receiving two or more priority values respectively associated with the two or more SAFI groups;
means for performing convergence of the routing tables in the SAFI groups only according to the priority values of the SAFI groups.

* * * * *